(No Model.) 2 Sheets—Sheet 1.
G. D. MILBURN.
FILM HOLDER FOR CAMERAS.
No. 485,393. Patented Nov. 1, 1892.
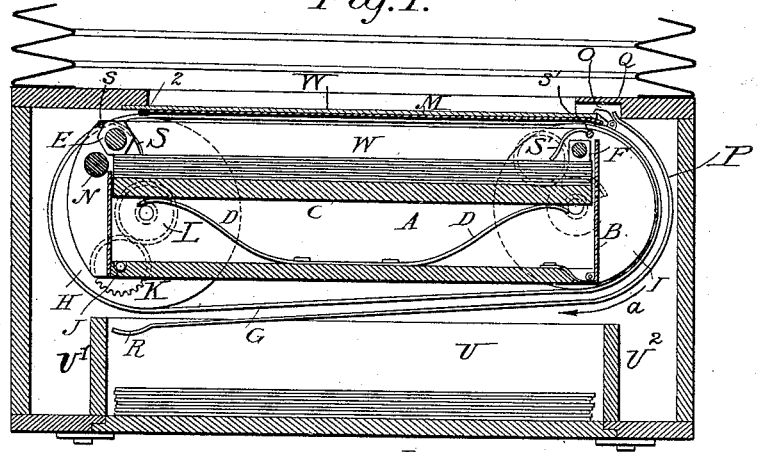
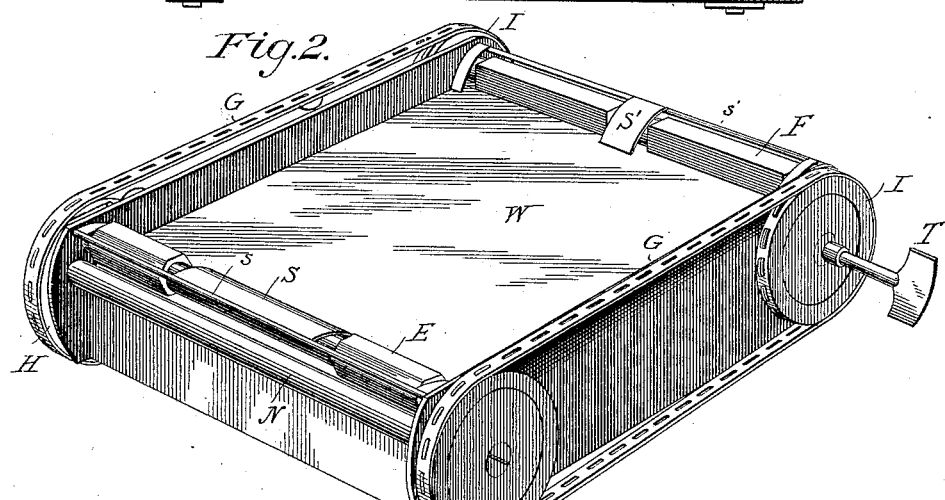
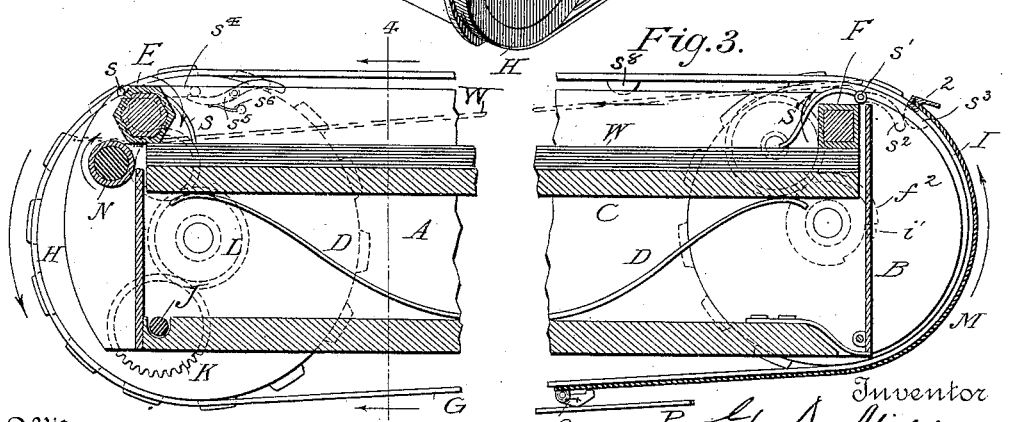
Witnesses
Raymond J. Barnes.
J. G. Jones.
Inventor
G. D. Milburn
By his Attorney
P. J. Dodge
THE NORRIS PETERS CO., PHOTO-LITHO., WASHINGTON, D. C.

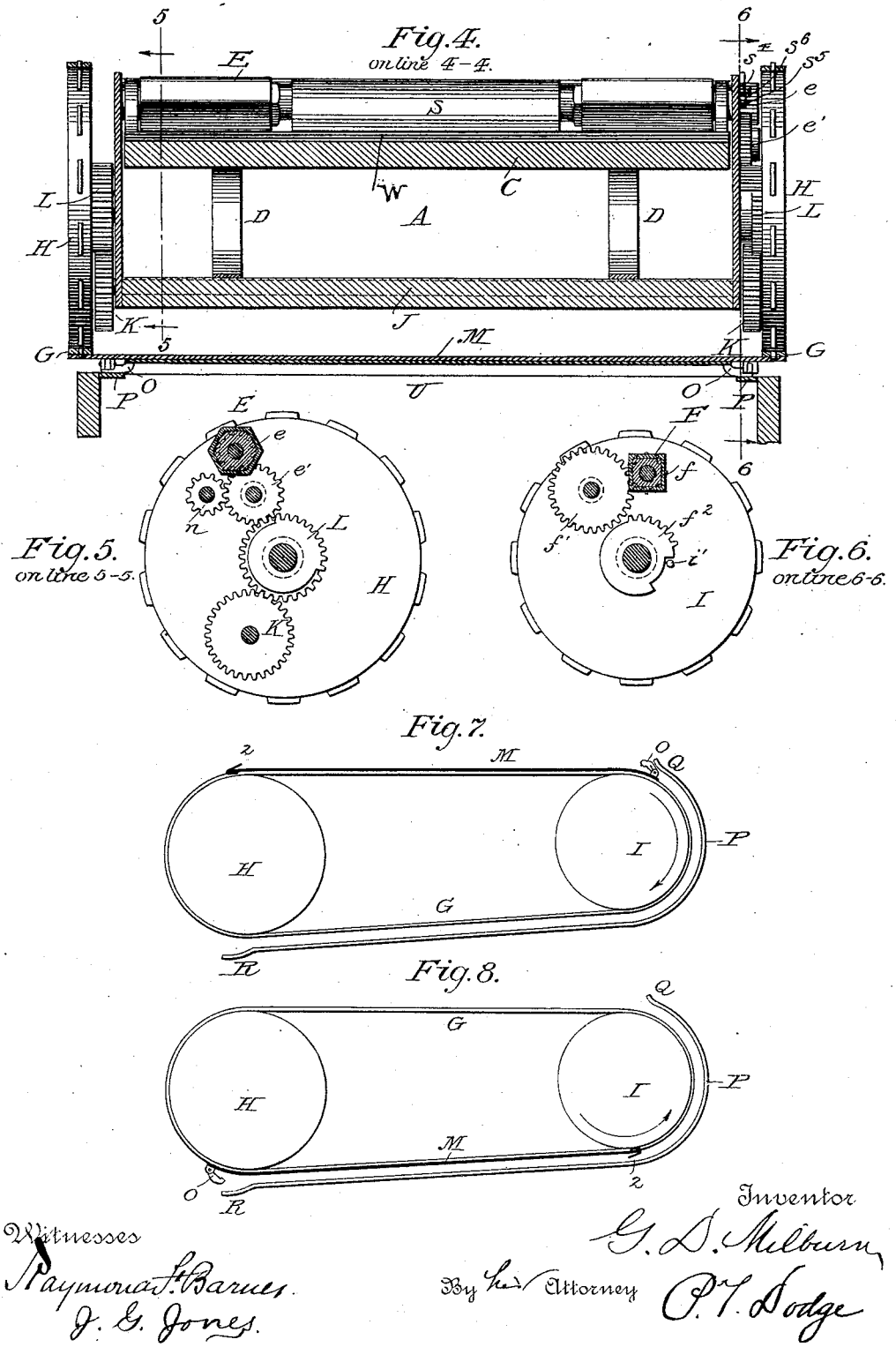

UNITED STATES PATENT OFFICE.

GUSTAVE DAVID MILBURN, OF ROCHESTER, NEW YORK, ASSIGNOR TO THE PHOTO MATERIALS COMPANY, OF SAME PLACE.

FILM-HOLDER FOR CAMERAS.

SPECIFICATION forming part of Letters Patent No. 485,393, dated November 1, 1892.

Application filed January 22, 1892. Serial No. 418,964. (No model.)

*To all whom it may concern:*

Be it known that I, GUSTAVE DAVID MILBURN, of Rochester, county of Monroe, and State of New York, have invented a new and useful Improvement in Film-Holders for Photographic Cameras, of which the following is a specification.

The object of my invention is to provide mechanism for use in or in connection with photographic cameras whereby a series of flexible sensitive sheets or films, laid one upon another, may be exposed successively to the action of the light passing through the lens, and transferred after "exposure" one at a time to a dark-chamber, from which they may be removed at will for development.

I propose to use in connection with my apparatus sheets or films of celluloid or paper or other transparent or translucent material coated with the ordinary gelatino-argentic emulsion or with any other suitable sensitive material. I propose to introduce these sheets cut to the sizes of the required negatives and arranged in a packet or series one upon another into my holder subject to the action of a spring at the rear, by which they are pressed forward, so that the foremost sheet is exposed to the focal plane. By means of a carrying device attached to parallel endless bands or other suitable guides I withdraw the front sheet after exposure and carry it to the receiving-chamber at the back. In order to confine the series of sheets at their ends and deliver them one at a time to the transferring device, I use rolls overlying the ends of the front sheet and adapted to turn in reverse directions and different distances in order to release the sheets one at a time. In connection with the bands or other carriers I employ a flexible curtain or septum, which is introduced beneath the foremost sheet prior to the exposure in order to prevent light from affecting the other sheets.

I believe myself to be the first to construct in any manner a film-holder in which a series of flexible films may be retained, a flexible septum introduced behind the front film to confine the action of the light thereto, and the front film when exposed thereafter flexed and transferred automatically to the storage-chamber around one side of the series of unexposed films, and although I prefer to employ substantially the details of construction which are represented in the accompanying drawings it is to be understood that they are simply illustrative of one form of my mechanism, and that the details may be modified and the invention embodied in many different forms the mechanical equivalents of that herein shown.

In the accompanying drawings, Figure 1 is a transverse section of the film-holder in accordance with my invention applied to the rear end of the camera. Fig. 2 is a perspective view showing the operative parts of my holder. Fig. 3 is a cross-section of the holder, on an enlarged scale, the better to show the details of the holding and releasing rolls, the middle portion being broken away to reduce the size of the figure. Fig. 4 is a cross-section on the line 4 4 of Fig. 3. Figs. 5 and 6 are cross-sections on the lines 5 5 and 6 6, looking in the direction indicated by the arrows and illustrating the gearing. Figs. 7 and 8 are diagrammatic views.

Referring to the drawings, A represents a rectangular box or case having at one end a door B, hinged to swing outward in order to admit of the packet of films being introduced. Within the case or holder A there is a movable follower-board C, acted upon by springs D, by which it is forced forward behind the packet of films in order to force them toward the front of the camera.

E and F represent two rollers journaled in the sides of the case and lying across the ends of the front film for the purpose of confining the series and for the further purpose of delivering them one at a time, as will be presently explained.

G G represent two endless bands extending lengthwise along the opposite sides of the case and passing around supporting-wheels H and I at its ends. These bands are provided at intervals with elongated slots or openings, which are adapted to receive teeth on the wheels. The wheels are journaled independently to the outer sides of the box; but in order to compel the bands to move in unison a shaft J is extended across the box from side to side and provided at its two ends with pinions K, engaging pinions L, fixed concentrically to the inner sides of the wheels H, as plainly shown in Figs. 4 and 5. To the bands there is attached a flexible sheet or septum M, of rubber, cloth, or other material impervious to light, so that by turning the bands to and fro this sheet may be carried over and caused to close the front of the case or carried backward around the wheels at one end until it occupies a position at the rear. These changes of position are clearly represented in the diagrams, Figs. 7 and 8.

In order to effect the exposure of a film to the light—that is to say, to the image passing through the lens of the camera—it is necessary to introduce a sheet or septum M beneath the foremost film, or, in other words, between it and the next film behind it. For this purpose I extend a round roller N across one end of the case outside of and adjacent to the roller E, as shown more particularly in Fig. 3, and I connect the three rolls E, F, and N with the wheels H and I by mutilated pinions, as shown in Figs. 5 and 6, in such manner that the rolls are turned differentially, as will be presently explained in detail. I also attach to the two bands, near one end of the apron or septum, the nippers or clips O, intended to grasp one end of the upper film. These nippers, carried in a circular path around the wheels I, are closely encircled during their movement by the exterior guides P, which serve to keep them pressed down in engagement with the film. The guides are, however, cut away at the front and at the back, as shown at Q and R, to allow the clips, which are formed with suitable springs, to open at the front to properly grasp the end of the film and at the back in order to release the same. In order to insure the movement of the film with the apron, I provide the latter at the end opposite the clips with a plate 2, having its edge projecting obliquely above the same, so that the film lies on the apron with one end beneath the clip and its opposite end beneath the projecting plate. When the septum begins its movement toward the right, as viewed in Fig. 7, the clips O are pressed down by the guides P and grip and hold the film until they reach the cut-away portion R, when they are free to swing back and release the film, as shown in Fig. 8. At the opposite ends of the case spring-fingers S S', &c., extend from transverse shafts $s$ $s'$ over the two rolls which bear on the ends of the film, the shafts being extended at one end through the casing, as shown. The shaft $s'$ is provided on its projecting end with an arm $s^2$, arranged in the path of a finger $s^3$ on the septum, so that when the latter is moved by the operating-key the finger coming in contact with the arm will depress the latter and rock the shaft, thereby lifting the finger S' and the film resting thereon, the latter having been moved forward upon the finger in the operation of releasing the opposite end from the roll E, as will be hereinafter explained, thus permitting a free passage of the septum beneath the film. To provide for a like action of the fingers on the rock-shaft $s$, the latter is provided on its extended end with an arm $s^4$, arranged to be lifted by the end of a dog $s^5$, pivoted to the casing. The opposite end of the dog is arranged in the path of the band G, and is so formed that a finger or projection $s^8$ on the latter on its passage will depress its end, and thereby rock the shaft, the operation being substantially the same as already explained with reference to the shaft $s$ and its finger or fingers. To return the shaft to its normal point, I provide a spring $s^6$, fixed to the side of the casing and arranged to bear on the dog $s^5$, as shown. A key T or other operating device is extended from one of the wheels I to the exterior of the apparatus, in order that the band may be moved to and fro at will.

A case constructed as above described is mounted in an inclosed light-tight box or chamber of any suitable construction, having in its back a compartment or chamber U.

The operation is as follows: Assume that the sheet or septum M is extended behind the foremost film W and that the film has been exposed. The second film is at this time held down at both ends by the rolls E and F. The operator now turns the bands in the direction indicated by the arrow $a$, as in Fig. 1, thereby withdrawing the septum in an endwise direction and carrying it to the rear. As the sheet or septum is thus moved the clips O are closed downward by the guides P upon the end of the film, which is consequently carried along upon the septum until it is finally extended flatwise in the back chamber U. As soon as it is thus delivered the clips O, having reached the cut-away portion R of the guides P, open and release it, so that the film becomes free and is left in the rear chamber to be removed for development. The wall U', Fig. 1, of the rear chamber U projects inward into the path of the film, while any movement of the film toward the right is prevented by the opposite wall $U^2$. It will be observed that the carriers travel in a path oblique to the length of the storage-chamber. As the bands complete their movement, carrying the exposed film to the rear, the hexagonal roll turns outward, slipping on the surface of the film, which is held fast at the opposite end by the square roll. This continues but a moment, after which both the square and the hexagonal rolls E and F turn in the direction indicated by the arrows in Fig. 3, thereby moving the top unexposed film endwise until it is released from the roll F, whereupon the end so released is thrown upward by the fingers S', its opposite end being still retained by the roll E. The motion of the bands is now reversed, causing the curtain to return again to the front and pass beneath the elevated end of the front film, the hexagonal roll E being at the same time turned toward the advancing curtain, so that it releases the second end of the front film, allowing the septum to pass under its entire surface, so that it may wholly protect the next underlying film from the light. As the curtain completes its advance to the front the clips O are brought into position preparatory to grasping its end, when it is in its turn to be carried to the rear. During the motion of the roll E to withdraw the front film from under the roll F the roll N is turned in the same direction as roll E; but being on the opposite side of the film its effect is to hold back the second film and prevent it from being carried outward with that at the front. The peculiar movements of the rolls above described are effected by means of the pinions shown in Figs. 5 and 6. The roll E is connected through its pinion $e$ and intermediate pinion $e'$ with the mutilated pinion L of wheel H, before alluded to. The roll N carries pinion $n$, which is also driven from the pinion $e'$. The square roll F is provided with pinion $f$, driven through pinion $f'$ from a mutilated pinion $f^2$. The pinion $f^2$ is mounted loosely on the stud carrying the wheel I, and is provided in its peripheral edge with a recess arranged to receive a pin $i'$, projecting from the side of the wheel I. Under this arrangement there is a limited play between the pinion and the wheel, which permits the rolls E and F to remain at rest during the greater part of the forward and backward movements of the septum, and whereby the two ends of the front film are successively released and thrown forward to permit the septum to pass in behind the same.

While I prefer to use rolls E and F in the sectional forms herein shown and to coat them with rubber or other soft material, it is to be understood that they may be varied in form at will and constructed of any suitable material.

Having thus described my invention, what I claim is—

1. In a magazine film-holder for a camera, the combination of a case to receive flexible unexposed films in series, means for moving the films forward by spring-pressure, means for releasing and separating the films from the front of the case one at a time, a traveling flexible septum, and means for introducing it behind the foremost film previous to the exposure and for transferring said exposed film to the rear of the case by flexing it around one side thereof, substantially as described.

2. In a film-holder for a camera, a box or case to receive films in series, a follower or pressure device to urge them forward, a flexible septum or curtain, endless carriers to which said curtain is attached and by which it may be moved from front to rear of the case at will, and means, substantially as described, for releasing and separating the front film that the septum may be passed thereunder.

3. In a magazine film-holder for a camera, the combination of a case to receive flexible unexposed films in series, means for moving the films forward by spring-pressure, means for releasing and separating the films from the front of the case one at a time, a traveling flexible septum, and means for introducing it behind the foremost film previous to the exposure, and a gripper device adapted to engage with one edge of the said film, whereby it is transferred to the rear of the case by being flexed around one side thereof, substantially as described.

4. In a magazine-holder for a camera, a case or receptacle for the unexposed films, a follower to press the films forward in series, a flexible septum, and means for carrying the same, substantially as described, rolls overlying the ends of the film, roll N to act on the back of the forward film, and gearing, substantially as described, for turning the rolls differentially to and fro to release the films one at a time, and means for separating the released films.

5. In a magazine film-holder for a camera, the combination of a case to receive flexible unexposed films in series, means for moving the films forward by spring-pressure, means for releasing and separating the films from the front of the case one at a time, a traveling flexible septum, and means for introducing it behind the foremost film previous to the exposure, and an oblique projecting ledge attached to the front edge of the septum and adapted to engage with the film, substantially as described.

6. In a magazine film-holder for a camera, the combination of a case to receive flexible unexposed films in series, means for moving the films forward by spring-pressure, means for releasing and separating the films from the front of the case one at a time, a traveling flexible septum, and means for introducing it behind the foremost film previous to the exposure, a gripper device adapted to engage with one edge of the said film, and an oblique projecting ledge at the front of the septum adapted to engage with the opposite edge of the said film, substantially as described.

7. In a magazine film-holder for a camera, the combination of a case to receive flexible unexposed films in series, means for moving the films forward by spring-pressure, means for releasing and separating the films from the front of the case one at a time, a traveling flexible septum, and means for introducing it behind the foremost film previous to the exposure and for transferring said exposed film to the rear of the case by flexing it around one side thereof, and a rear storage-chamber adapted to receive and retain the exposed films, substantially as described.

8. In a film-holder for a camera, a box or case to receive flexible films in series, a follower or pressure device to urge them forward, a traveling flexible septum, carriers on opposite sides of the case, connected to move in unison, means for releasing and separating the films from the front of the case one at a time, and means for introducing the septum behind the foremost film previous to exposure and for transferring said exposed film to the rear of the case by flexing it around one side thereof, substantially as described.

In testimony whereof I hereunto set my hand this 20th day of January, 1892, in the presence of two attesting witnesses.

GUSTAVE DAVID MILBURN.

Witnesses:
W. R. KENNEDY,
RAYMOND F. BARNES.